(12) United States Patent
Baik

(10) Patent No.: US 12,045,064 B2
(45) Date of Patent: Jul. 23, 2024

(54) ELECTRONIC DEVICE AND VEHICLE CONTROL METHOD OF ELECTRONIC DEVICE, SERVER AND METHOD FOR PROVIDING PRECISE MAP DATA OF SERVER

(71) Applicant: Samsung Electronics Co., Ltd., Suwon-si (KR)

(72) Inventor: Aron Baik, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 17/270,663

(22) PCT Filed: Sep. 20, 2019

(86) PCT No.: PCT/KR2019/012268
§ 371 (c)(1),
(2) Date: Feb. 23, 2021

(87) PCT Pub. No.: WO2020/060308
PCT Pub. Date: Mar. 26, 2020

(65) Prior Publication Data
US 2021/0341940 A1 Nov. 4, 2021

(30) Foreign Application Priority Data
Sep. 21, 2018 (KR) .................. 10-2018-0114434

(51) Int. Cl.
*G05D 1/00* (2024.01)
*G01C 21/00* (2006.01)

(52) U.S. Cl.
CPC ....... *G05D 1/0274* (2013.01); *G01C 21/3878* (2020.08); *G01C 21/3889* (2020.08); *G01C 21/3896* (2020.08)

(58) Field of Classification Search
CPC ......... G05D 1/0274; G05D 2201/0213; G05D 1/0282; G05D 1/0268; G01C 21/3878;
(Continued)

(56) References Cited

U.S. PATENT DOCUMENTS 6,889,134 B2 5/2005 Nakane et al.
8,260,544 B2 9/2012 Kawa
(Continued)

FOREIGN PATENT DOCUMENTS

CN 101509777 A 8/2009
CN 102236538 A 11/2011
(Continued)

OTHER PUBLICATIONS

Extended European Search Report dated Aug. 23, 2021, in European Patent Application No. 19863849.6-1202.
(Continued)

*Primary Examiner* — Donald J Wallace
(74) *Attorney, Agent, or Firm* — Jefferson IP Law, LLP

(57) ABSTRACT

Provided are a method, performed by an electronic device, of controlling a vehicle, and an electronic device for the same. A method, performed by an electronic device, of controlling a vehicle includes: transmitting, to an external server communicatively connected to the vehicle, as profile information of the vehicle, sensor information regarding at least one sensor mounted on the vehicle, communication efficiency information of the vehicle, and driving information of the vehicle; receiving, from the external server, precise map data related to at least one map layer selected based on the profile information of the vehicle from among a plurality of map layers that are combined to form a precise map and distinguished according to attributes thereof; and controlling the vehicle to perform autonomous driving by using the received at least one precise map data.

17 Claims, 12 Drawing Sheets

(58) Field of Classification Search
CPC .... G01C 21/3889; G01C 21/3896; G01C 21/30; G01C 21/362; G06N 20/00; G08G 1/096827; G08G 1/09685
See application file for complete search history.

(56) References Cited

U.S. PATENT DOCUMENTS

| | | | |
|---|---|---|---|
| 9,665,100 | B2 | 5/2017 | Shashua et al. |
| 9,958,278 | B2 | 5/2018 | Habib et al. |
| 10,019,003 | B2 | 7/2018 | Ryu et al. |
| 10,133,280 | B2 | 11/2018 | Kim et al. |
| 10,366,508 | B1 * | 7/2019 | Liu .................. G06V 20/10 |
| 10,434,964 | B2 | 10/2019 | Jun |
| 10,768,305 | B2 | 9/2020 | Baik |
| 10,906,539 | B2 | 2/2021 | Yang et al. |
| 2006/0058952 | A1 | 3/2006 | Cooper et al. |
| 2009/0187336 | A1 | 7/2009 | Kawamata et al. |
| 2011/0130951 | A1 | 6/2011 | Lee |
| 2016/0275131 | A1 | 9/2016 | Lublinsky et al. |
| 2017/0090476 | A1 * | 3/2017 | Letwin ................. B60W 30/08 |
| 2017/0192436 | A1 | 7/2017 | Min et al. |
| 2017/0256034 | A1 | 9/2017 | Bai et al. |
| 2018/0003512 | A1 | 1/2018 | Lynch |
| 2018/0098227 | A1 * | 4/2018 | Carnelli ............... H04W 4/029 |
| 2018/0143648 | A1 | 5/2018 | Kim et al. |
| 2018/0164811 | A1 | 6/2018 | Yoo |
| 2018/0204456 | A1 | 7/2018 | Philosof et al. |
| 2018/0224286 | A1 * | 8/2018 | Pickering ........... G01C 21/3611 |
| 2019/0049257 | A1 * | 2/2019 | Westover ............... G01C 21/28 |
| 2019/0049958 | A1 * | 2/2019 | Liu ....................... G01S 17/00 |
| 2019/0064799 | A1 * | 2/2019 | Amirloo Abolfathi ................... G07C 5/0808 |
| 2020/0110422 | A1 * | 4/2020 | Takamatsu ...... B60W 30/18163 |
| 2020/0279488 | A1 * | 9/2020 | Shibasaki ............. B60W 30/10 |
| 2021/0293572 | A1 * | 9/2021 | Konrardy ............... G06F 21/55 |

FOREIGN PATENT DOCUMENTS

| | | |
|---|---|---|
| CN | 105404689 A | 3/2016 |
| CN | 105783939 A | 7/2016 |
| CN | 106067891 A | 11/2016 |
| CN | 108027242 A | 5/2018 |
| CN | 108475062 A | 8/2018 |
| EP | 3 322 204 A1 | 5/2018 |
| JP | 2003-075177 A | 3/2003 |
| JP | 2005-345712 A | 12/2005 |
| JP | 2006-267418 A | 10/2006 |
| JP | 2009-175252 A | 8/2009 |
| JP | 2017-32422 A | 2/2017 |
| KR | 10-1170380 B1 | 8/2012 |
| KR | 10-2017-0054186 A | 5/2017 |
| KR | 10-2017-0082165 A | 7/2017 |
| KR | 10-2018-0000672 A | 1/2018 |
| KR | 10-2018-0068490 A | 6/2018 |
| WO | 2018/015811 A1 | 1/2018 |
| WO | 2018/106763 A1 | 6/2018 |

OTHER PUBLICATIONS

International Search Report and written opinion dated Jan. 8, 2020, in the International Application No. PCT/KR2019/012268.
European Office Action dated Jan. 4, 2022, issued in European Patent Application No. 19863849.6-1202.
Korean Office Action dated Mar. 26, 2022, issued in Korean Patent Application No. 10-2018-0114434.
European Office Action dated May 19, 2022, issued in European Patent Application No. 19863849.6-1205.
Korean Notice of Allowance dated Sep. 19, 2022, issued in Korean Patent Application No. 10-2018-0114434.
European Notice of Allowance dated Nov. 3, 2022, issued in European Patent Application No. 19863849.6-1205.
Chinese Office Action dated Jul. 29, 2023, issued in Chinese Application No. 201980060668.6.
Chinese Office Action dated Feb. 29, 2024, issued in Chinese Application No. 201980060668.6.

* cited by examiner

ELECTRONIC DEVICE AND VEHICLE CONTROL METHOD OF ELECTRONIC DEVICE, SERVER AND METHOD FOR PROVIDING PRECISE MAP DATA OF SERVER

TECHNICAL FIELD

The present disclosure relates to a method and system for providing precise map data based on information obtained from a vehicle.

BACKGROUND ART

Recently, with the increasing interest in autonomous vehicles, technologies related to autonomous driving are attracting attention. Autonomous driving requires technologies for implementing the steps of recognizing an external environment of a vehicle, determining an operation of the vehicle and its driving route required by the external environment of the vehicle, and controlling the operation of the vehicle based on the determined information. The steps need to be organically combined together and implemented to achieve autonomous driving, but the 'recognition step', which is the basis for more accurate determination and control, may be the most fundamental step in autonomous driving.

Autonomous vehicles may use positioning sensors such as radio detection and ranging (radar), light detection and ranging (lidar), camera, and ultrasound sensors to implement the 'recognition step'. However, situations where such a positioning sensor cannot be used may occur depending on the weather conditions or road environment. Furthermore, a LIDAR sensor is difficult to use while driving at high speed due to limitations in its recognition range.

Precise map data plays a complementary role with respect to recognition information from the above-described positioning sensors. Since the precise map data includes information related to lanes, stop line locations, traffic light locations, etc., expressed in very small units of measurement (e.g., in centimeters (cm)), it serves to help an autonomous vehicle with a 'recognition step'. Accordingly, the importance of precise map data that can complement a recognition limit of a positioning sensor and improve autonomous driving performance has been gradually increasing.

DESCRIPTION OF EMBODIMENTS

Technical Problem

A vehicle needs to obtain a precise map for assisting autonomous driving from an external server communicating with the vehicle by taking into account a geographic region where the vehicle is travelling or is expected to travel. However, since precise map data needs to include information about all driving routes with precision in very small units of measurement, the precise map data requires a large amount of data for construction. Accordingly, there is a need to selectively obtain precise map data from an external server by using information of a vehicle.

The purpose of the present disclosure is to propose a method whereby an autonomous vehicle may operate safely and reliably by obtaining precise map data based on information of a vehicle (e.g., vehicle resources or planning for autonomous driving).

Solution to Problem

A method, performed by an electronic device, of controlling a vehicle includes: transmitting, to an external server communicatively connected to the vehicle, as profile information of the vehicle, sensor information regarding at least one sensor mounted on the vehicle, communication efficiency information of the vehicle, and driving information of the vehicle; receiving, from the external server, precise map data related to at least one map layer selected based on the profile information of the vehicle from among a plurality of map layers that are combined to form a precise map and distinguished according to attributes thereof; and controlling the vehicle to perform autonomous driving by using the received at least one precise map data.

According to another embodiment of the present disclosure, a method, performed by a server, of providing precise map data includes: generating a precise map by combining a plurality of map layers distinguished according to attributes thereof; receiving, from a vehicle communicating with the server, as profile information of the vehicle, sensor information regarding at least one sensor mounted on the vehicle, communication efficiency information of the vehicle, and location information of the vehicle; selecting at least one map layer based on the received profile information of the vehicle, from among the plurality of map layers combined to form the precise map; and transmitting precise map data related to the selected at least one map layer to the vehicle.

According to another embodiment of the disclosure, an electronic device for controlling a vehicle includes: a communication module configured to communicate with an external server; at least one processor configured to execute at least one instruction; and at least one memory storing the at least one instruction, wherein the at least one processor is configured to execute the at least one instruction to: control the communication module to transmit, to the external server communicatively connected to the vehicle, as profile information of the vehicle, sensor information regarding at least one sensor mounted on the vehicle, communication efficiency information of the vehicle, and driving information of the vehicle; control the communication module to receive, from the external server, precise map data related to at least one map layer selected based on the profile information of the vehicle from among a plurality of map layers that are combined to form a precise map and distinguished according to attributes thereof; and control the vehicle to perform autonomous driving by using the received at least one precise map data.

According to another embodiment of the present disclosure, a server for providing precise map data includes: a communication module configured to communicate with a vehicle; at least one processor configured to execute at least one instruction; and at least one memory storing the at least one instruction and a plurality of map layers distinguished according to attributes thereof, wherein the at least one processor is configured to execute the at least one instruction to: control the communication module to receive, from the vehicle, as profile information of the vehicle, sensor information regarding at least one sensor mounted on the vehicle, communication efficiency information of the vehicle, and location information of the vehicle; select at least one map layer based on the received profile information of the vehicle, from among the plurality of map layers combined to form a precise map; and control the communication module to transmit precise map data related to the selected at least one map layer to the vehicle.

Advantageous Effects of Disclosure

According to the present disclosure, a server may transmit, to a vehicle, precise map data related to at least one map layer that is selected from among a plurality of map layers combined to form a precise map by taking into account profile information of the vehicle, and the vehicle may use the received precise map data to achieve autonomous driving.

Accordingly, by receiving only precise map data needed by the vehicle, it is possible to quickly obtain precise map data and achieve stable autonomous driving.

In particular, when information about levels of autonomy and information about a surrounding environment are further taken into consideration as profile information of the vehicle, it is possible to provide more customized precise map data to the vehicle. Thus, the reliability of autonomous driving of the vehicle may be improved.

Furthermore, the server may select at least one map layer from among a plurality of map layers based on profile information of the vehicle and transmit precise map data related to the selected at least one map layer to the vehicle. This allows the precise map data to be transmitted to the vehicle by using a minimum communication resource.

In addition, by sharing feature data among a plurality of precise maps and cross-checking the feature data against each other, an efficient operation of a precise map may be achieved, the reliability of the precise map may be improved, and the safety of the vehicle receiving verified precise map data may be enhanced.

MODE OF DISCLOSURE

Figure 1:
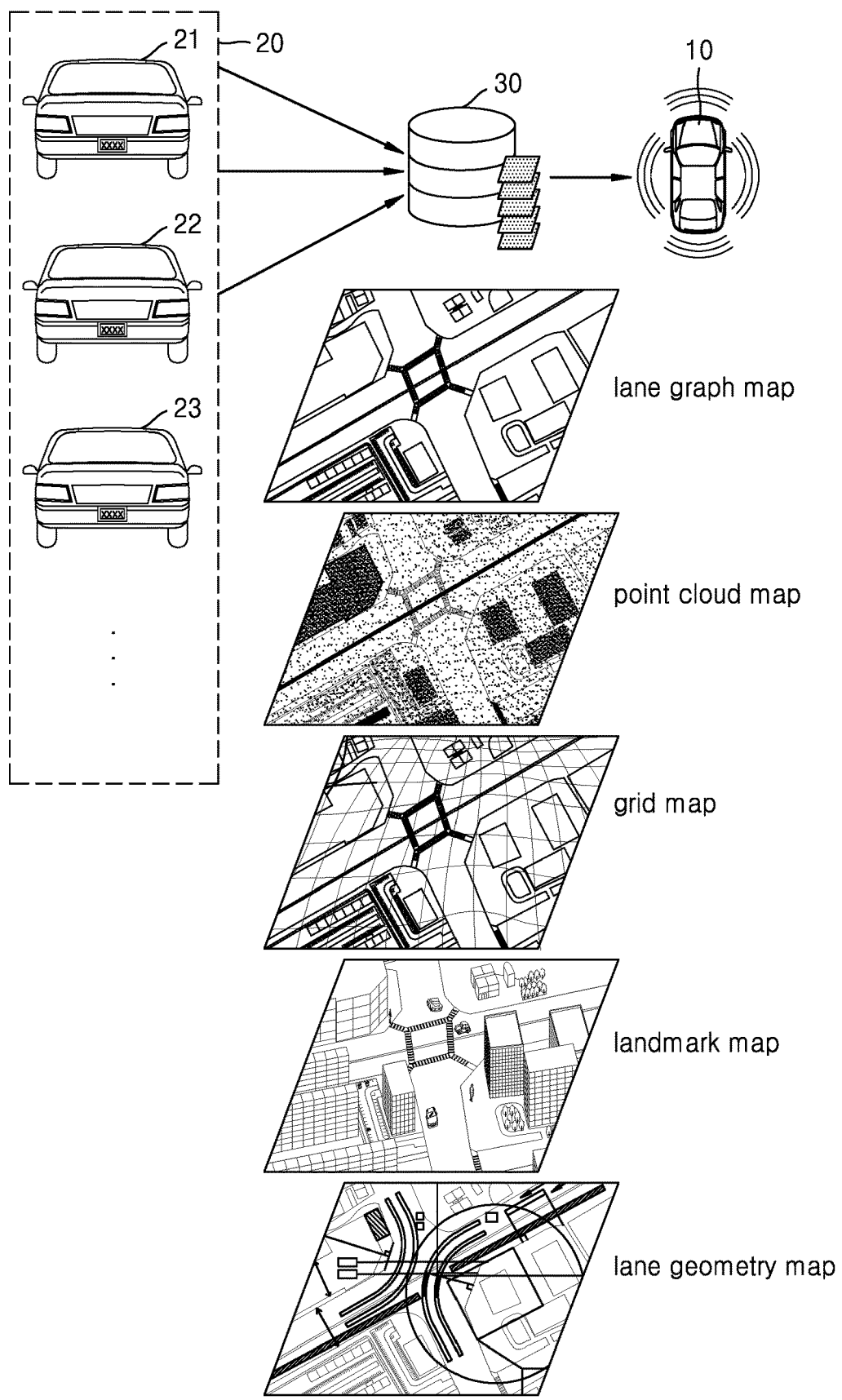
FIG. 1 is a schematic diagram illustrating a system for providing precise map data according to an embodiment.

Terms used in the present specification will now be briefly described and then the present disclosure will be described in detail.

The terms used in the present disclosure are general terms currently widely used in the art based on functions described in the present disclosure, but may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Throughout the specification, when a part "includes" or "comprises" an element, unless there is a particular description contrary thereto, the part may further include other elements, not excluding the other elements. Furthermore, terms such as "portion," "module," etc. used herein indicate a unit for processing at least one function or operation and may be embodied as hardware or software or a combination of hardware and software.

Throughout the specification, a communication method may include a communication method using a predetermined communication standard, a predetermined frequency band, a predetermined protocol, or a predetermined channel. For example, the communication method may include, but is not limited to, a wireless LAN (Wi-Fi), Bluetooth, Bluetooth Low Energy (BLE), Wi-Fi Direct (WFD), ultra wideband (UWB), Near Field Communication (NFC), Ant+ Zigbee, 3rd generation (3G), 4th generation (4G), Long-Term Evolution (LTE), a communication method using ultrasonic waves, an Infrared Data Association (IrDA) communication method, a communication method using sound, etc.

Embodiments of the present disclosure will now be described more fully hereinafter with reference to the accompanying drawings so that they may be easily implemented by one of ordinary skill in the art. However, the present disclosure may have different forms and should not be construed as being limited to the descriptions set forth herein. Parts not related to descriptions of the present disclosure are omitted to clearly explain embodiments of the present disclosure in the drawings, and like reference numerals denote like elements throughout.

Hereinafter, the present disclosure will be described in detail with reference to the accompanying drawings.

FIG. 1 is a schematic diagram illustrating a system for providing precise map data according to an embodiment.

According to an embodiment, a system for providing precise map data (hereinafter, referred to as a system) may include a vehicle 10, a plurality of other vehicles 20 (21, 22, 23, . . . ), and a server 30. The server 30 may receive and manage pieces of precise map data for specific routes, which are generated by the plurality of other vehicles 20, and provide precise map data appropriate for the vehicle 10 requesting precise map data for a particular route.

Precise map data may be data including all information necessary for making a determination to control an operation of an autonomous vehicle. The precise map data may include basic road information, surrounding environment information, detailed road environment information (e.g., terrain elevation, terrain curvature, etc.), and dynamically changing road condition information (traffic congestion, an accident section, a construction section, etc.). The precise map data may include high-precision map data (or high-definition (HD) map data). The precise map data may include map information that is a three-dimensional (3D) representation of roads and surrounding environment within a very small error range (e.g., at a centimeter (cm) level). The precise map data may include road surroundings information represented in 3D, geometric information such as a road shape or facility structure, and semantic information such as traffic signs or lane marks.

The plurality of other vehicles 20 may generate precise map data and transmit it to the server 30. For example, each of the plurality of other vehicles 20 may collect driving data via at least one sensor while travelling along a predetermined route and generate precise map data based on the collected driving data. The at least one sensor may include at least one of a Global Positioning System (GPS), an Inertial Measurement Unit (IMU), a Radio Detection and Ranging (RADAR) sensor, a Light Detection and Ranging (LIDAR) sensor, an image sensor, a temperature/humidity sensor, an infrared sensor, an ultrasonic sensor, a proximity sensor, an RGB sensor, a geomagnetic sensor, an acceleration sensor, or a gyroscope sensor, but is not limited thereto. Furthermore, the driving data may be data including a driving image, sensed information, measurement information, etc., obtained via at least one sensor coupled to each of the plurality of other vehicles 20 while each vehicle is traveling along a predetermined route, but is not limited thereto. The driving image may mean an image of surroundings of a vehicle, which is obtained via at least one sensor while the vehicle is traveling along a specific route. The sensed information may include information obtained by detecting an object, an obstacle, a road infrastructure, etc., surrounding the vehicle via at least one sensor while the vehicle is traveling. The measurement information may include information obtained by measuring, via at least one sensor, a distance between a vehicle and its surrounding vehicle, a speed of the surrounding vehicle, and a size and a location of road structures around the vehicle while the vehicle is traveling.

For example, each of the plurality of other vehicles 20 may recognize a surrounding environment of the vehicle at 360 degrees by using an image sensor. Furthermore, each vehicle may obtain information about lanes, stop lines, and road markings via a front camera and an around-view camera and obtain information about surrounding vehicles, obstacles, and road structures via a LIDAR sensor or RADAR sensor.

Each of the plurality of other vehicles 20 may obtain precise map data corresponding to a specific route based on the driving data. For example, each of the plurality of other vehicles 20 may obtain, based on driving data for a specific route (e.g., measurement information about road structures, lanes, stop lines, and road markings on the specific route, etc.), precise map data including map information, road environment information, and road condition information, all of which are 3D representations of roads and their surroundings on the specific route.

In an embodiment, each of the plurality of other vehicles 20 may store driving data collected while travelling in a memory and obtain precise map data for a specific route based on the driving data stored in the memory after the traveling is completed. In another embodiment, each of the plurality of other vehicles 20 may obtain precise map data corresponding to a specific route in real-time by using driving data collected while traveling.

The server 30 may receive pieces of precise map data provided by the plurality of other vehicles 20. Alternatively, the server 30 may directly generate pieces of precise map data by receiving pieces of driving data from the plurality of other vehicles 20.

The server 30 may classify the pieces of precise map data according to predetermined criteria and perform a predetermined management process. For example, the server 30 may manage pieces of precise map data by classifying them according to each vehicle providing the precise map data, each route, each time, each context, or each reliability.

The server 30 may generate a precise map based on the pieces of precise map data. The precise map may be composed of a combination of a plurality of map layers distinguished according to attributes thereof.

In an embodiment, a plurality of map layers distinguished according to attributes thereof may include, for example, at least one of a lane graph layer, a point cloud map layer, a grid map layer, a landmark map layer, a lane geometry map layer, and a radar signature map layer.

In another embodiment, a plurality of map layers distinguished according to attributes thereof may include at least one of a layer including precise map data for a specific route, a layer including data regarding lanes of a road included in the specific route, a layer including data regarding a location and a structure of traffic lights and signs on the road included in the specific route, a layer including data regarding the weather at the time of collection for the specific route, a layer including data regarding traffic jams or road construction, and a layer including data regarding a traffic light signal and pedestrian movement at the time of collection for the specific route.

In various embodiments, the server 30 may generate, for example, a precise map corresponding to a long route by using a plurality of pieces of precise map data collected from the plurality of other vehicles 20. For example, the server 30 may generate a global map corresponding to roads around the world.

The server 30 may receive a request for precise map data for a specific driving route from the vehicle 10. The server 30 may provide, in response to the request for precise map data, at least one piece of precise map data for a specific route based on a predetermined criterion. Beyond simply informing the user of a route to a destination, the precise map data may provide information necessary for generating a route to the destination, continuously monitoring a current location of the vehicle 10 to move the vehicle 10 along the generated route, and determining a speed a direction of the vehicle 10, so that the vehicle 10 may perform autonomous driving.

In this case, the server 30 may determine at least one piece of precise map data to be provided to the vehicle 10 based on profile information of the vehicle 10, which is received from the vehicle 10. Furthermore, the server 30 may determine at least one precise map data to be provided to the vehicle 10 by further taking into account a reliability ranking of precise map data and a driving environment in which precise map data is to be used.

The profile information of the vehicle 10 may include, for example, at least one of sensor information regarding at least one sensor mounted on the vehicle 10, communication efficiency information of the vehicle 10, and driving information of the vehicle 10.

The driving information of the vehicle 10 may include, for example, at least one of information about a location where the vehicle 10 is travelling, information about a geographic region through which the vehicle 10 is traveling, information about a driving route of the vehicle 10, and information about a driving plan for the vehicle 10. For example, the driving information of the vehicle 10 is information about a condition of a road on which the vehicle 10 is travelling or is expected to travel and may include information about planning for entry to an intersection, information about planning for driving at a non-intersection location, information about planning for driving within or outside a city, or information about planning for driving on a highway or regional road.

The sensor information regarding at least one sensor mounted on the vehicle 10 may include at least one of a sensor type, the number of sensors, a sensor mounting location, and a sensor specification. For example, types of a vehicular sensor may include a RADAR sensor that measures a distance to an object, a LIDAR sensor that measures a distance to an object by using a laser beam, an image sensor (or camera) that recognizes surrounding objects, or a stereo image sensor (or stereo camera) that is a sensor capable of measuring a distance to an object as well as recognizing the surrounding objects.

The communication efficiency information of the vehicle 10 may include at least one of a transmission speed of communication between the server 30 and the vehicle 10 and a communication bandwidth allocated for the communication between the server 30 and the vehicle 10.

In an embodiment, the server 30 may transmit, to the vehicle 10, only precise map data related to some of a plurality of map layers constituting a precise map according to the communication efficiency information. For example, when a communication environment is poor or the allocated bandwidth is narrow, it may be difficult for the server 30 to provide all pieces of precise map data for a specific route to an external device in a timely manner. In this case, the server 30 may provide only at least one map layer including some information about a specific route to the external device.

In various embodiments, the profile information of the vehicle 10 may include information about levels of autonomy of the vehicle 10. For example, the levels of autonomy may be divided into six (6) levels from 'Level 0' to 'Level 5'. 'Level 0' stands for no automation and may be a stage in which a driver is in complete control of a vehicle. 'Level 1' may be a driver assistance stage in which the driver controls the speed and direction of the vehicle and an autonomous driving system assists the driver with the other functions. 'Level 2' may be a partial automation stage in which the driver actively intervenes in driving the vehicle to continuously monitor the surroundings while the autonomous driving system adjusts the speed and direction of the vehicle to satisfy specific conditions. 'Level 3' may be a conditional automation stage where the driver needs not actively intervene in driving the vehicle or monitor the surroundings at all times but may remain prepared to take control of the driving of the vehicle 10 when required. At this level, the autonomous driving system may provide lead time for the driver to respond so that the driver may intervene in driving before reaching the system limit, while adjusting the speed and direction of the vehicle to satisfy specific conditions. 'Level 4' may be a high automation stage where the driver does not intervene in driving at all under specific conditions while the autonomous driving system actively takes control of the speed and direction of the vehicle under the specific conditions. 'Level 5' may be a full automation stage where the driver does not intervene in driving in any situation while the autonomous driving system actively controls the speed and direction of the vehicle 10 in all situations.

In various embodiments, the profile information of the vehicle 10 may further include at least one of a type of the vehicle 10, identification information of the vehicle 10, and a network ID of the vehicle 10.

In various embodiments, the profile information of the vehicle 10 may further include information about the surrounding environment of the vehicle 10. For example, the information about the surrounding environment of the vehicle 10 may include environment complexity such as traffic congestion, pedestrian congestion, street complexity, etc.

As a response to the request for precise map data, the vehicle 10 may receive, from the server 30, precise map data related to at least one map layer selected among the plurality of map layers based on the profile information of the vehicle 10. The vehicle 10 may perform autonomous driving by using the received at least one precise map data.

Figure 2:
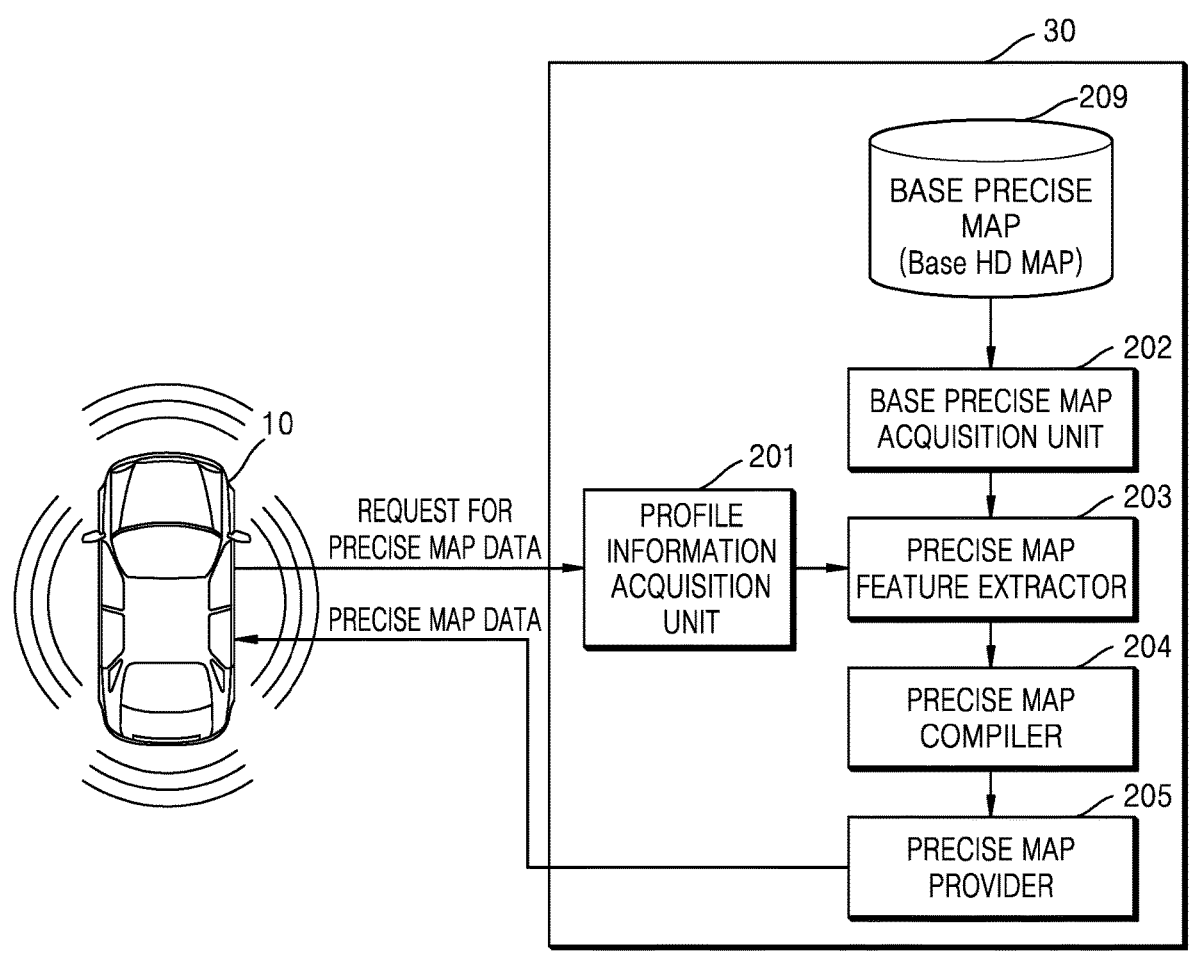
FIG. 2 is a detailed block diagram of a server for providing precise map data according to an embodiment.

FIG. 2 is a detailed block diagram of a server 30 for providing precise map data according to an embodiment.

Referring to FIG. 2, the server 30 may include a profile information acquisition unit 201, a base precise map acquisition unit 202, a precise map feature extractor 203, a precise map compiler 204, and a precise map provider 205. The above components may be modules included in one or more processors. In addition, two or more of the above components may be combined and implemented, and one component may be divided into two or more components. Furthermore, the above components may be software modules or hardware modules, and some of the above components may be configured as software modules while the rest of them may be configured as hardware modules. In addition, names of the above components may vary according to their purposes, functions, or implemented configurations.

In FIG. 2, a vehicle 10 may request precise map data from the server 30. In this case, the vehicle 10 may transmit profile information of the vehicle 10 to the server 30, together with the request for the precise map data.

The profile information acquisition unit 201 of the server 30 may acquire profile information of the vehicle 10. The profile information of the vehicle 10 may include at least one of sensor information regarding at least one sensor mounted on the vehicle 10, communication efficiency information of the vehicle 10, and driving information of the vehicle 10.

The base precise map acquisition unit 202 of the server 30 may acquire a base precise map from a base precise map (or a base High-Definition map) database (DB) 209. The base precise map may be a precise map generated using driving data or precise map data provided by the plurality of other vehicles 20 described above. The base precise map may be a precise map previously stored in the server 30 or a precise map generated in response to the request for precise map data from the vehicle 10.

The precise map feature extractor 203 of the server 30 may select at least one map layer from among a plurality of sub-layers constituting a precise map. For example, the precise map feature extractor 203 may select at least one map layer from among a plurality of map layers constituting a precise map, based on the profile information of the vehicle 10 acquired by the profile information acquisition unit 201. The precise map feature extractor 203 may extract feature data from the selected at least one map layer.

In this case, the precise map feature extractor 203 may select at least one map layer from among the plurality of map layers constituting the precise map based on the profile information of the vehicle 10 acquired by the profile information acquisition unit 201 and extract at least one piece of feature data from the selected at least one map layer. Alternatively, the precise map feature extractor 203 may extract at least one piece of feature data from the plurality of map layers constituting the precise map, based on the profile information of the vehicle 10 acquired by the profile information acquisition unit 201. Feature data is data included in a map layer that is distinguished according to attributes thereof, and examples of the feature data may include, but are not limited to, pieces of sensor data acquired from a RADAR sensor, a LIDAR sensor, and an image sensor, landmark information, basic lane information, detailed lane information, surrounding environment information, detailed surrounding environment information, dynamically changing situation information, etc.

The precise map compiler 204 of the server 30 may generate precise map data to be transmitted to the vehicle 10 by using the extracted at least one piece of feature data. The precise map provider 205 of the server 30 may transmit the generated precise map data to the vehicle 10.

Figure 3:
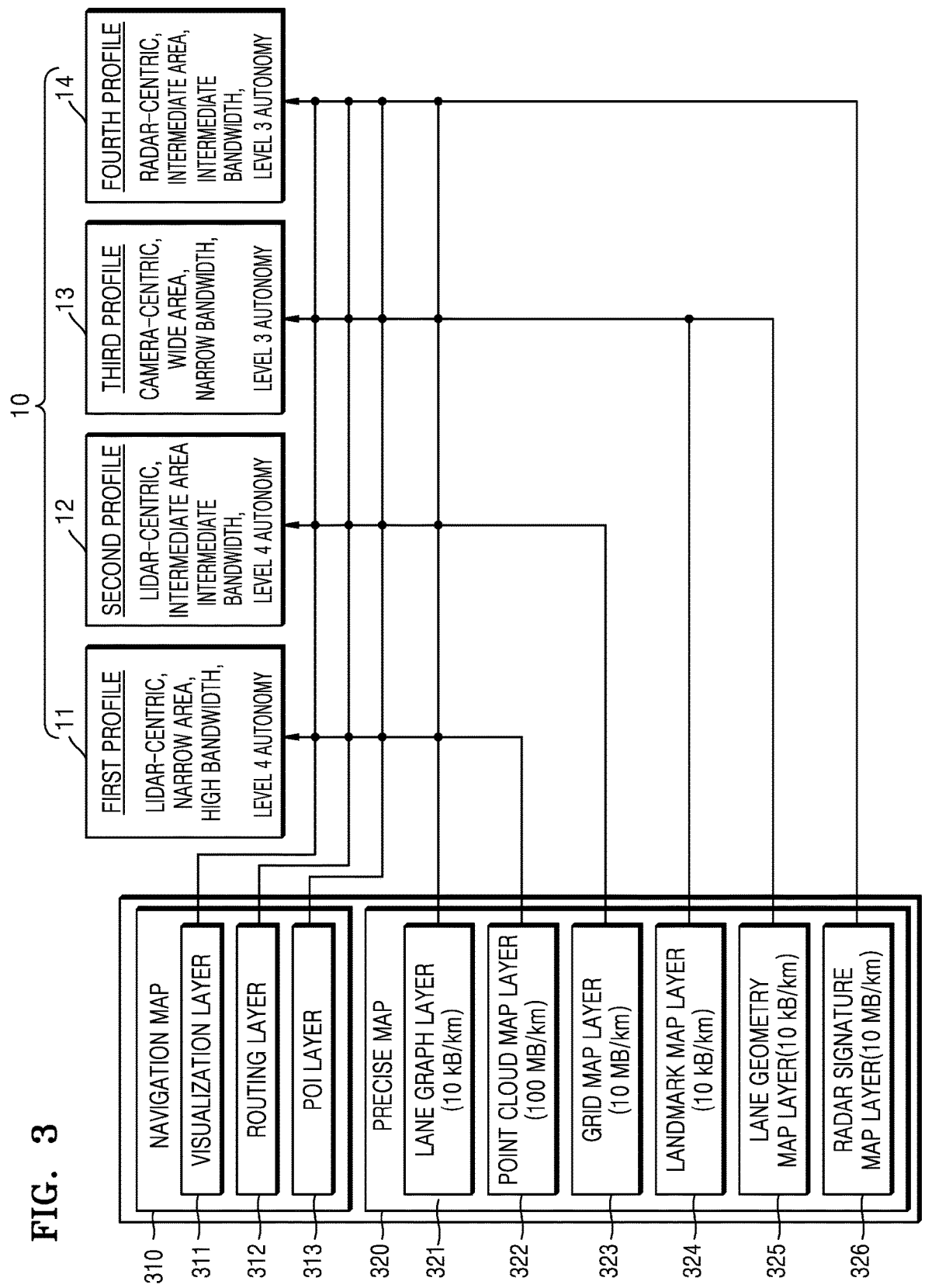
FIG. 3 is a diagram illustrating a process of selecting at least one map layer from among a plurality of map layers, according to an embodiment.

FIG. 3 is a diagram illustrating a process of selecting at least one map layer from among a plurality of map layers, according to an embodiment.

Referring to FIG. 3, the server 30 may store a navigation map 310 and a precise map 320. The server 30 may store at least one of the navigation map 310 and the precise map 320 in a DB provided in the server 30 or acquire the same from an external device for temporary storage when necessary. The server 30 may provide at least one of a plurality of map layers to the vehicle 10 based on profile information of the vehicle 10.

In an embodiment, a map having high precision may be required in a situation where the vehicle 10 is traveling in a city. On the other hand, in a situation where the vehicle 10 is traveling on a highway, precise map data having high precision may not be required. For example, only precise map data including lane data and landmark data may be required. The server 30 may provide the vehicle 10 with precise map data related to a high-precision layer or multiple layers in a situation where a map having high precision is required, the server 30 may provide the vehicle 10 with only precise map data related to a low-precision layer or a minimum number of layers in a situation where a map having high precision is not required.

The navigation map 310 is a map for assisting the driver in driving and may include, for example, information about a route in meters. The navigation map 310 may be a combination of a plurality of map layers distinguished according to attributes thereof. The plurality of map layers distinguished according to attributes thereof may include, for example, a visualization layer 311, a routing layer 312 used for calculating a route according to a destination, a place of interest (POI) layer 313 required for selecting a location according to a destination search, etc.

The precise map 320 is a map for assisting the vehicle in autonomous driving and may include, for example, information about a route in centimeters. The precise map 320 may be a combination of a plurality of map layers distinguished according to attributes thereof. The plurality of map layers distinguished according to attributes thereof may include, for example, at least one of a lane graph layer 321, a point cloud map layer 322, a grid map layer 323, a landmark map layer 324, a lane geometry map layer 325, and a radar signature map layer 326. In this case, the lane graph layer 321, the landmark map layer 324, and the lane geometry map layer 325 may each have a data size of about 10 kilobytes (kB) per kilometer (km), the point cloud map layer 322 may have a data size of about 100 megabytes (MB) per km, and the grid map layer 323 and the radar signature map layer 326 may each have a data size of about 10 MB per km.

In this case, the server 30 may transmit, to the vehicle 10, precise map data related to at least one map layer determined among the plurality of map layers, i.e., 311 through 313 and 321 through 326, based on a profile of the vehicle 10 (e.g., first through fourth vehicles 11 through 14). In this case, a criterion for transmitting precise map data related to at least one map layer to the vehicle 10 may be determined based on the profile information of the vehicle 10. The profile information may include at least one of sensor information regarding at least one sensor mounted on the vehicle 10 (e.g., sensor configuration information, centric sensor information, etc.), communication efficiency information (e.g., available bandwidth information), driving information (e.g., a region in which the vehicle 10 is expected to travel, a range of coverage of autonomous driving, etc.), and information about a level of autonomy.

In an embodiment, referring to FIG. 3, when a profile (a first profile) of the first vehicle 11 includes information related to LIDAR sensor-centric, a narrow area coverage (e.g., an urban core or ward), a high bandwidth, and 'Level 4' autonomy, the server 30 may provide the first vehicle 11 with precise map data related to the plurality of map layers, i.e., 311 through 313 constituting the navigation map 310, the lane graph layer 321, and the point cloud map layer 322. As another example, a profile (a second profile) of the second vehicle 12 includes information related to LIDAR sensor-centric, an intermediate area coverage (e.g., a downtown area or city), an intermediate bandwidth, and 'Level 4' autonomy, the server 30 may provide the second vehicle 12 with precise map data related to the plurality of map layers 311 through 313 constituting the navigation map 310, the lane graph layer 321, and the grid map layer 323. As another example, a profile (a third profile) of the third vehicle 13 includes information related to camera-centric, a wide area coverage (e.g., a suburban area, highway area, or province), a narrow bandwidth, and 'Level 3' autonomy, the server 30 may provide the third vehicle 13 with precise map data related to the plurality of map layers 311 through 313 constituting the navigation map 310, the lane graph layer 321, the landmark map layer 324, and the lane geometry map layer 325. As another example, a profile (a fourth profile) of the fourth vehicle 14 includes information related to RADAR sensor-centric, an intermediate area coverage (e.g., a downtown area or city), an intermediate bandwidth, and 'Level 3' autonomy, the server 30 may provide the fourth vehicle 14 with precise map data related to the plurality of map layers 311 through 313 constituting the navigation map 310, the lane graph layer 321, and the radar signature map layer 326.

Figure 4:
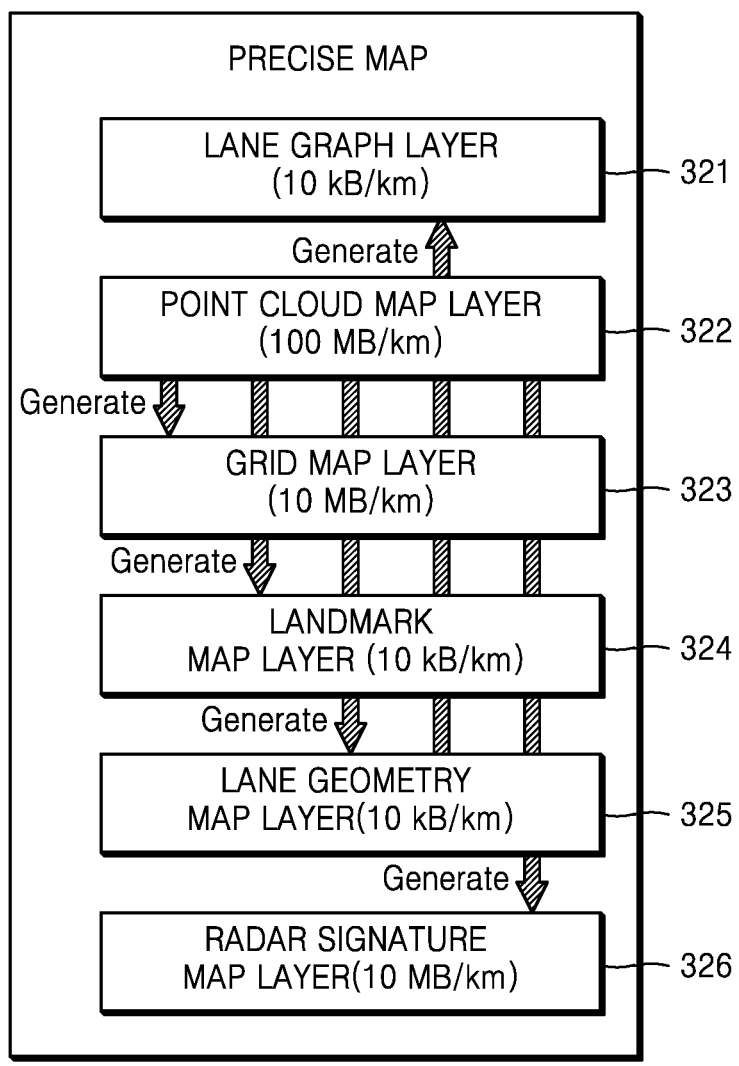
FIG. 4 is a diagram illustrating a process of updating a precise map, according to an embodiment.

FIG. 4 is a diagram illustrating a process of updating a precise map, according to an embodiment.

Referring to FIG. 4, the server 30 may update another map layer by using feature data included in one map layer among a plurality of map layers.

For example, in FIG. 4, the server 30 may update the grid map layer 323, the landmark map layer 324, the lane geometry map layer 325, and the radar signature map layer 326 by using feature data (or representations) extracted from the point cloud map layer 322. Furthermore, the server 30 may update the lane graph layer 321 by using feature data extracted from the lane geometry map layer 325.

As a result of sharing feature data included in a map layer as described above, for example, the point cloud map layer 322 may include not only lidar data but also RGB color data obtained from the camera.

Figure 5:
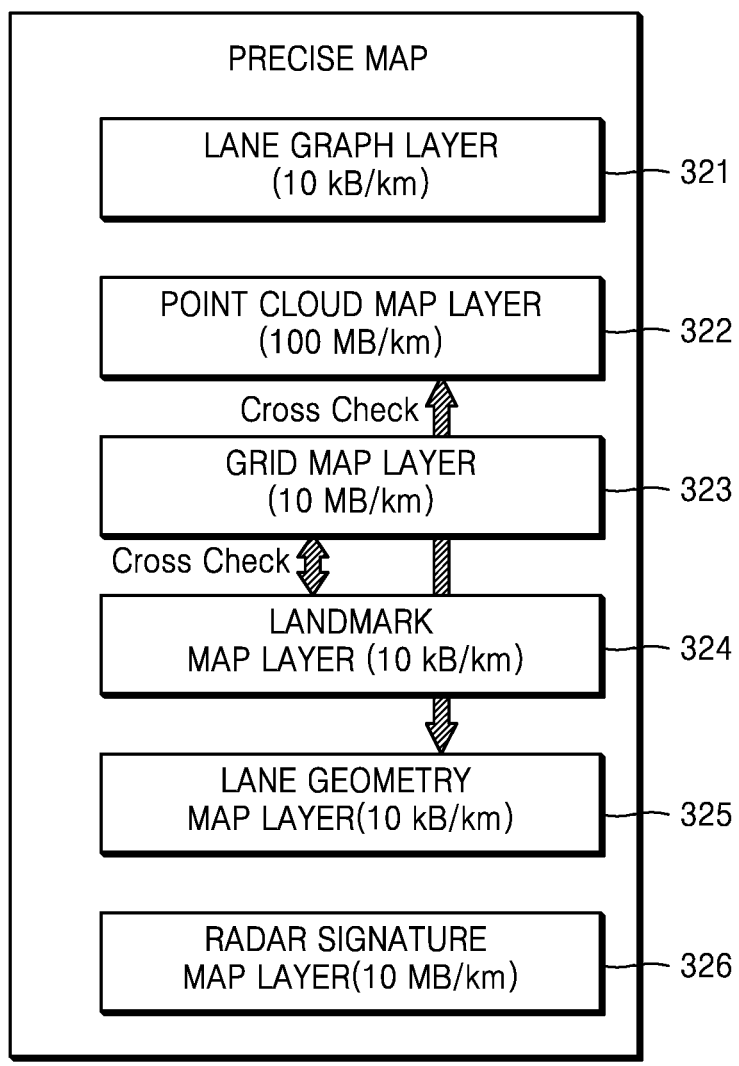
FIG. 5 is a diagram illustrating a process of verifying a precise map according to an embodiment.

FIG. 5 is a diagram illustrating a process of verifying a precise map according to an embodiment.

Referring to FIG. 5, the server 30 may cross-check pieces of feature data included in at least two map layers among a plurality of map layers against each other.

For example, in FIG. 5, the server 30 may cross-check feature data included in the grid map layer 323 against feature data included in the landmark map layer 324. Alternatively, the server 30 may cross-check feature data included in the point cloud map layer 322 against feature data included in the lane geometry map layer 325.

For example, as a result of verifying (or cross-checking) feature data, when pieces of feature data for the same location or the same path in a plurality of layers are different from each other, the server 30 may modify or update feature data in another layer based on one of the plurality of layers. For example, the server 30 may modify or update feature data in another layer based on feature data or a layer having a high reliability by taking into account reliabilities of the plurality of layers and reliabilities of the feature data to be cross-checked. Here, a reliability may be determined by taking into account a driving environment at the time of collecting the feature data, the number of repeated driving activities, a collection date, a difference between information about sensed surroundings and feature data, etc.

Figure 6:
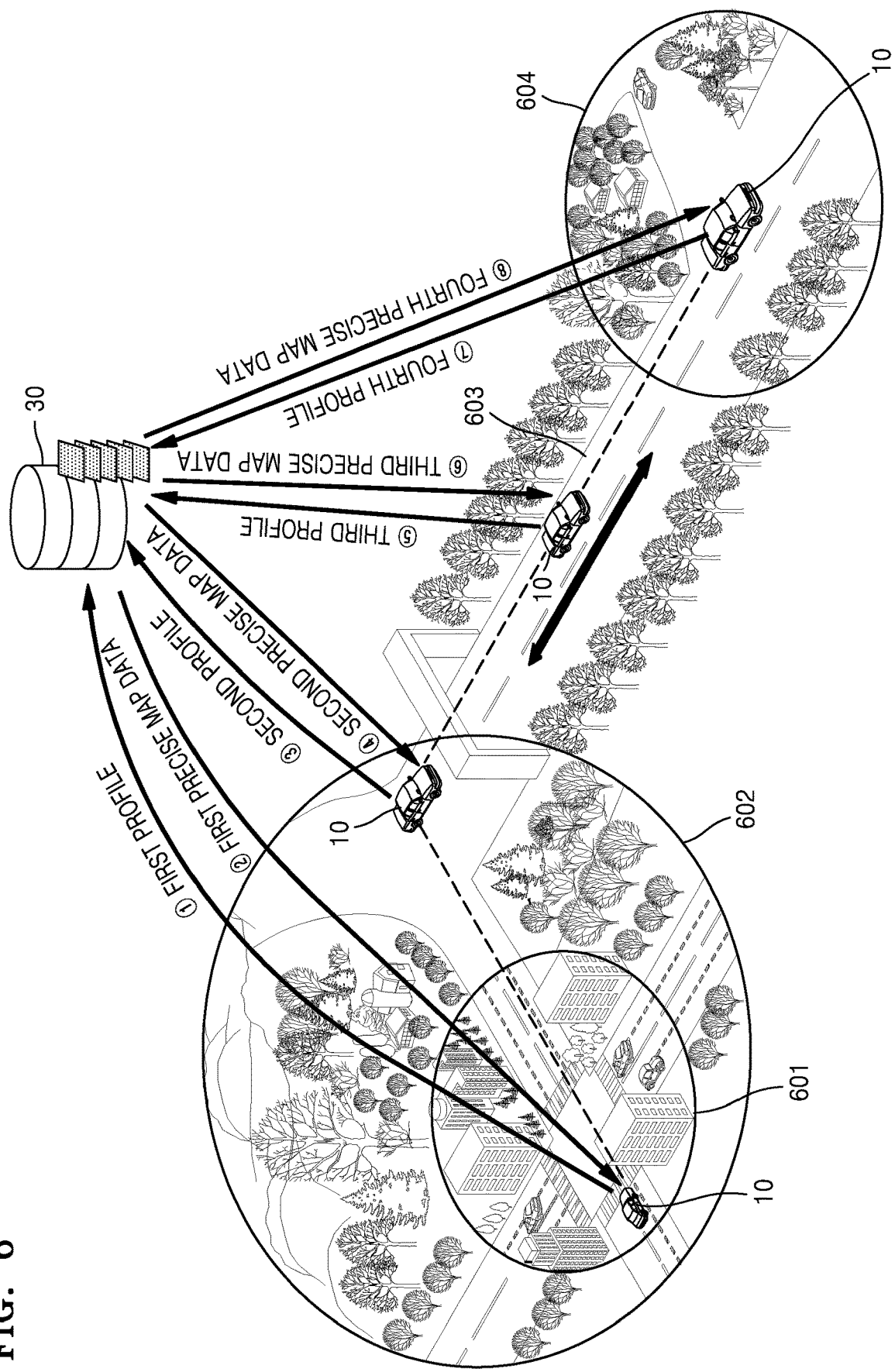
FIGS. 6 and 7 are diagrams illustrating a process of providing precise map data in a situation where a vehicle is traveling, according to an embodiment.
Figure 7:
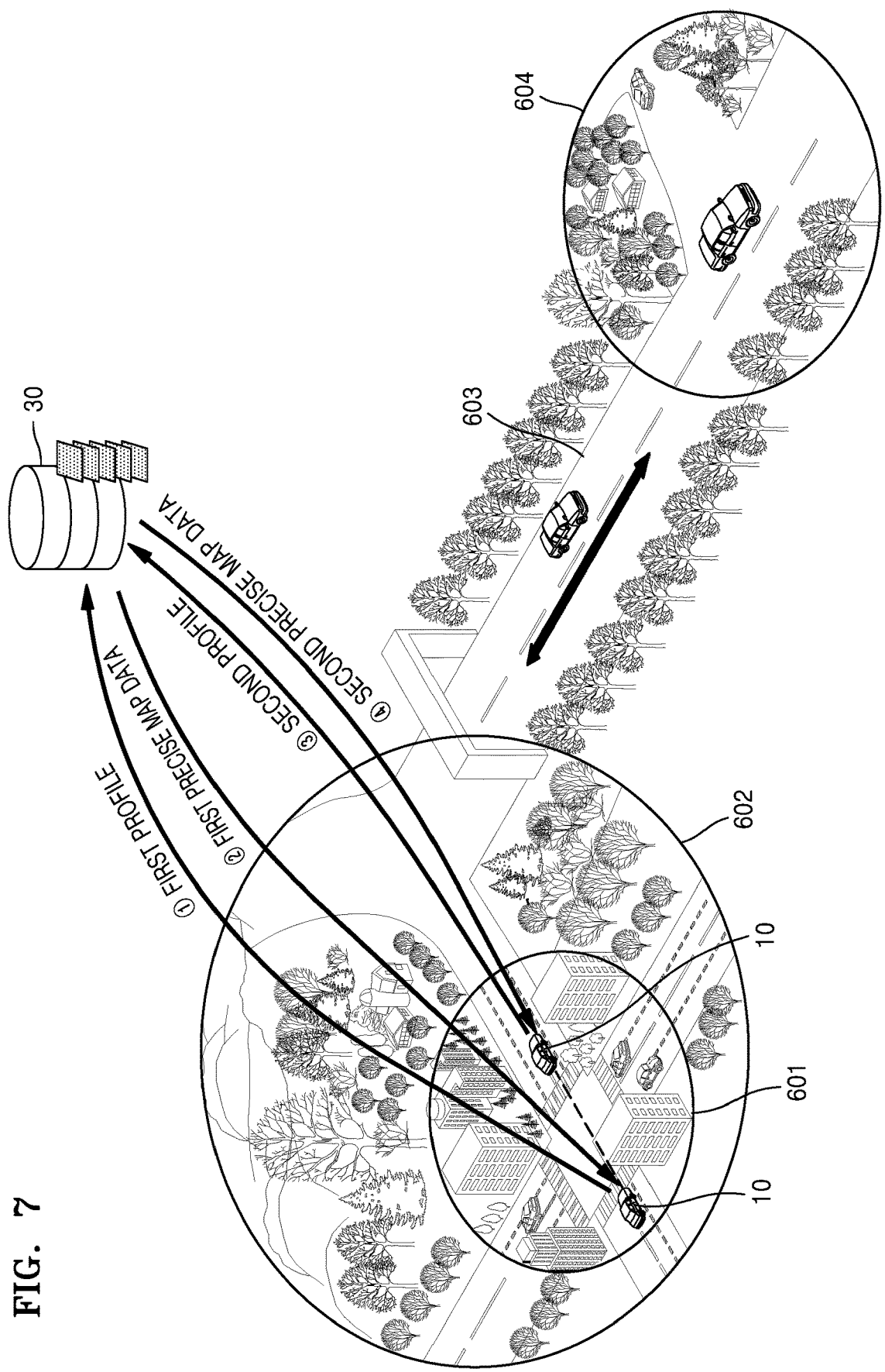

FIGS. 6 and 7 are diagrams illustrating a process of providing precise map data in a situation where a vehicle 10 is traveling, according to an embodiment.

Referring to FIG. 6, the vehicle 10 may travel through a first area 601, a second area 602, a third area 603, and a fourth area 604. In this case, the vehicle 10 may transmit profile information suitable for a driving situation encountered by the vehicle 10 to the server 30 for each area in which the vehicle 10 is traveling. In addition, the vehicle 10 may receive precise map data corresponding to profile information transmitted for each area in which the vehicle 10 is traveling. As described above, profile information suitable for a driving situation encountered by the vehicle 10 may include at least one of sensor information regarding at least one sensor mounted on the vehicle 10, communication efficiency information of the vehicle 10, and driving information of the vehicle 10. The profile information suitable for the driving situation encountered by the vehicle 10 may further include at least one of information about a surrounding environment of the vehicle 10, information about a level of autonomy in the vehicle 10, and the vehicle 10.

For example, when traveling in the first area 601 (e.g., an urban core), the vehicle 10 may transmit information of a first profile (e.g., the first profile in FIG. 3) to the server 30 (①) and receive, from the server 30, first precise map data related to at least one map layer selected from among a plurality of map layers based on the information of the first profile (②). When the vehicle 10 moves from the first area 601 to the second area 602 (e.g., a downtown area located outside the urban core), the vehicle 10 may transmit information of a second profile (e.g., the second profile in FIG. 3) to the server 30 (③) and receive, from the server 30, second precise map data related to at least one map layer selected from among the plurality of map layers based on the information of the second profile (④). When the vehicle 10 then moves again from the second area 602 to the third area 603 (e.g., a suburban area or highway area), the vehicle 10 may transmit information of a third profile (e.g., the third profile in FIG. 3) to the server 30 (⑤) and receive, from the server 30, third precise map data related to at least one map layer selected from among the plurality of map layers based on the information of the third profile (⑥). When the vehicle 10 then moves again from the third area 603 to the fourth area 604 (e.g., a downtown area), the vehicle 10 may transmit information of the fourth profile (e.g., the fourth profile in FIG. 3) to the server 30 (⑦) and receive, from the server 30, fourth precise map data related to at least one map layer selected from among the plurality of map layers based on the information of the fourth profile (⑧).

In other words, the vehicle 10 is capable of dynamically receiving precise map data for travelling in each area by taking into account a profile corresponding to each area in which the vehicle 10 travels.

In various embodiments, the vehicle 10 may receive a plurality of pieces of precise map data corresponding to a plurality of profiles. For example, when traveling in the first area 601, the vehicle 10 may receive and store in advance all of the first precise map data based on the information of the first profile and the second precise map data based on the information of the second profile. In this case, the vehicle 10 may adaptively select one precise map data between the first precise map data and the second precise map data by taking into account a driver's request or an autonomous driving environment of the vehicle 10 and use the selected precise map data to control autonomous driving of the vehicle 10.

In another embodiment, as shown in FIG. 7, the vehicle 10 may receive in advance precise map data corresponding to an area in which the vehicle 10 is expected to travel. For example, in order to improve the safety of autonomous driving, the vehicle 10 may receive and store in advance a plurality of pieces of precise map data corresponding to an area in which the vehicle 10 is expected to travel.

For example, referring to FIG. 7, the vehicle 10 located in the first area 601 may transmit information of the first profile (e.g., the first profile in FIG. 3) to the server 30 while traveling in the first area 601 (①) and receive, from the server 30, the first precise map data related to at least one map layer selected from among the plurality of map layers based on the information of the first profile (②). Furthermore, while traveling in the first area 601, the vehicle 10 located in the first area 601 may transmit in advance, to the server 30, location information of the second area 602, which is a planned driving route, and information of the second profile expected from the second area 602 (③) and receive in advance, from the server 30, and store precise map data related to at least one map layer selected from among the plurality of map layers based on the information of the second profile (④). Furthermore, while traveling in the second area 602, the vehicle 10 may perform autonomous driving by using the previously received precise map data.

Figure 8:
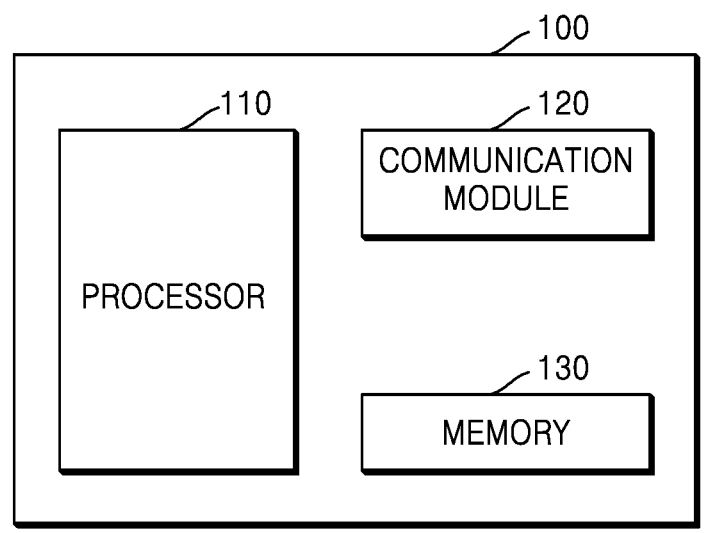
FIG. 8 is a block diagram of a configuration of an electronic device according to an embodiment.

FIG. 8 is a block diagram of a configuration of an electronic device 100 according to an embodiment.

The electronic device 100 may be an electronic device for assisting driving of the vehicle 10 described with reference to FIGS. 1 through 7.

The electronic device 100 may include at least one of a navigation device, a global navigation satellite system (GNSS), an event data recorder (EDR), a flight data recorder (FDR), at least a part of an infortainment system for a transportation apparatus (e.g., a vehicle), electronic equipment for a ship (e.g., navigation equipment for a ship, a gyro compass, etc.), avionics, or a head unit for a vehicle. Alternatively, the electronic device 100 may include at least one of an electronic board or at least a part of a transportation apparatus. Alternatively, the electronic device 100 may be an Advanced Driver Assistance Systems (ADAS) or a part of the ADAS. Alternatively, the electronic device 100 may be a control device such as an Electronic Control Unit (ECU) for electronically controlling various functions related to an operation of a transportation device, or a part of the control device. Furthermore, when the electronic device 100 is an external device coupled to a transportation device, the electronic device may be, for example, a driving assistance device such as on board diagnostics (OBD) connected to a vehicle connector (e.g., an OBD terminal or OBD connector) or a part of the driving assistance device. Alternatively, the electronic device 100 may include at least one of a smartphone, a tablet PC, a mobile phone, a video phone, an e-book reader, a laptop PC, a netbook computer, a wearable device, a portable multimedia player (PMP), or an MP3 player. The electronic device 100 may be configured in various forms and may be operatively and/or electrically connected to the vehicle 10.

The electronic device 100 may include a processor 110, a communication module 120, and a memory 130. All components shown in FIG. 8 are not essential components of the electronic device 100. The electronic device 100 may be implemented with more or fewer components than those shown in FIG. 8.

The processor 110 may execute software to control at least one other component (e.g., a hardware or software component) of the electronic device 100 connected to the processor 110 and perform various types of data processing or computations. According to an embodiment, as at least a part of data processing or computation, the processor 110 may load commands or data received from another component into a volatile memory, process the commands or data stored in the volatile memory, and store the resulting data in a non-volatile memory. According to an embodiment, the processor 110 may include a main processor (e.g., a central processing unit (CPU) or an application processor (AP)) and an auxiliary processor (e.g., a graphics processing unit (GPU), an image signal processor (ISP), a sensor hub processor, or a communication processor (CP)) that is operable independently of or in conjunction with the main processor. Additionally or alternatively, the auxiliary processor may be configured to use less power than the main processor or to be specialized for a designated function. The auxiliary processor may be implemented separately from, or as a part of the main processor.

The communication module 120 may support establishing a direct (e.g., wired) communication channel or a wireless communication channel between the electronic device 100 and an external electronic device (e.g., a component of the vehicle 10, another vehicle 20, or the server 30) and performing communication via the established communication channel. The communication module 120 may include one or more CPs that operate independently from the processor 110 (e.g., an AP) and support a direct (e.g., wired) communication or wireless communication. According to an embodiment, the communication module 120 may include a wireless communication module (e.g., a cellular communication module, a short-range wireless communication module, or a GNSS communication module) or a wired communication module (e.g., a local area network (LAN) communication module or a power line communication (PLC) module). The communication module 120 may communicate with an external electronic device via a first network (e.g., a short-range communication network such as Bluetooth™, wireless-fidelity (Wi-Fi) direct, or IrDA) or a second network (e.g., a long-range communication network such as a cellular network, the Internet, or a computer network (e.g., LAN or wide area network (WAN)). Various types of communication modules may be integrated into a single component (e.g., a single chip) or be implemented as a plurality of separate components (e.g., a plurality of chips).

The memory 130 may store various types of data used by at least one component (e.g., the processor 110) of the electronic device 100. The various types of data may include, for example, software and input data or output data for a command related thereto. The memory 130 may include a volatile memory or a non-volatile memory. A program may be stored in the memory 130 as software and include, for example, an operating system (OS), middleware, or an application.

In various embodiments, the electronic device 100 may include the communication module 120 communicating with the server 30, at least one processor 110 executing at least one instruction, and at least one memory 130 storing the at least one instruction. The at least one processor 110 may execute the at least one instruction to control the communication module 120 to transmit, to the server 30 communicatively connected to the vehicle 10, sensor information regarding at least one sensor mounted on the vehicle 10, communication efficiency information of the vehicle 10, and driving information of the vehicle 10 as profile information of the vehicle 10. The at least one processor 110 may control the communication module 120 to receive, from the server 30, precise map data related to at least one map layer as a result of the transmission, the at least one map layer being selected based on the profile information of the vehicle 10 from among a plurality of map layers that are combined to form a precise map and distinguished according to attributes thereof.

In various embodiments, the profile information of the vehicle 10 may further include information about a level of autonomy. In this case, the at least one processor 110 may control the communication module 120 to receive, from the server 30, precise map data related to at least one map layer selected based on the information about the level of autonomy of the vehicle 10 from among a plurality of map layers that are combined to form a precise map and distinguished according to attributes thereof.

In various embodiments, the profile information of the vehicle 10 may further include information about the surrounding environment of the vehicle 10. In this case, the at least one processor 110 may control the communication module 120 to receive precise map data related to at least one map layer selected based on the information about the surrounding environment of the vehicle 10.

In various embodiments, the vehicle 10 may travel from a first area to a second area. In this case, the at least one processor 110 may control the communication module 120 to transmit profile information corresponding to the second area to the server 30. The at least one processor 110 may control the communication module 120 to receive, from the server 30, precise map data related to at least one map layer in response to the transmission of the profile information, the at least one map layer being selected from among a plurality of map layers based on the profile information corresponding to the second area.

Figure 9:
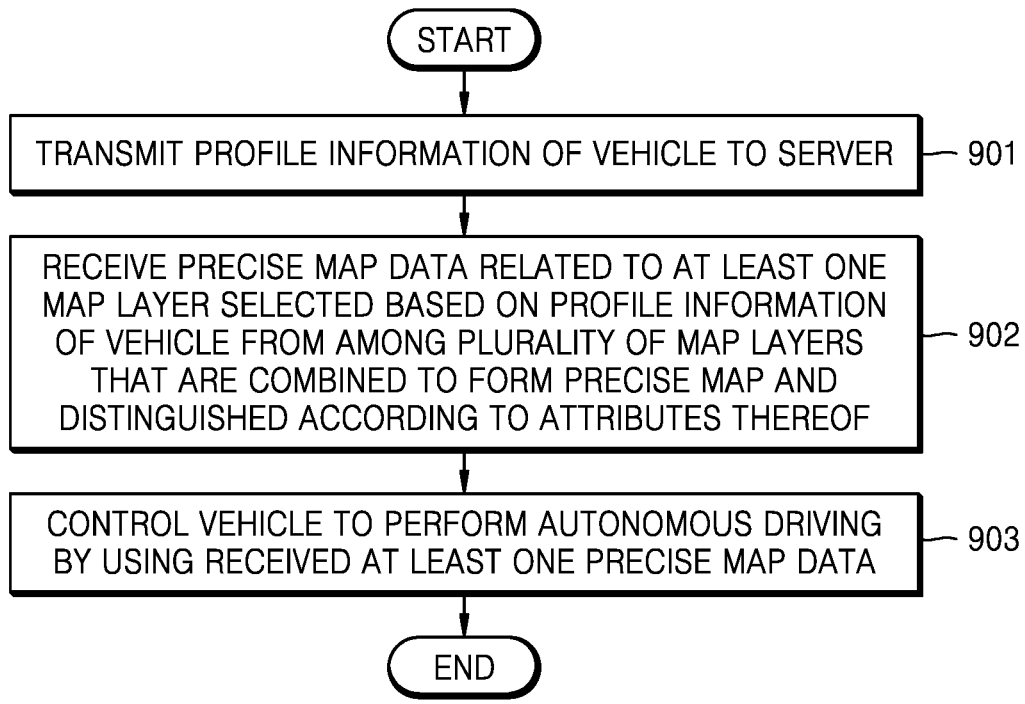
FIG. 9 is a flowchart of a method, performed by an electronic device, of controlling a vehicle, according to an embodiment.

FIG. 9 is a flowchart of a method, performed by the electronic device 100, of controlling the vehicle 10, according to an embodiment.

Referring to FIG. 9, the electronic device 100 may transmit profile information of the vehicle 10 to the server 30 (operation 901). For example, the profile information of the vehicle 10 may include sensor information regarding at least one sensor mounted on the vehicle 10, communication efficiency information of the vehicle 10, and driving information of the vehicle 10.

The electronic device 100 may receive, from the server 30, precise map data related to at least one map layer in response to the transmission of the profile information, the at least one map layer being selected based on the profile information of the vehicle 10 from among a plurality of map layers that are combined to form a precise map and distinguished according to attributes thereof (operation 902).

In various embodiments, the profile information of the vehicle 10 may further include information about a level of autonomy required for driving of the vehicle 10. In this case, the electronic device 100 may receive precise map data related to at least one map layer selected based on the information about the level of autonomy of the vehicle 10 from among a plurality of map layers.

In various embodiments, the profile information of the vehicle 10 may further include information about the surrounding environment of the vehicle 10. In this case, the electronic device 100 may receive precise map data related to at least one map layer selected from among a plurality of map layers based on the information about the surrounding environment of the vehicle 10.

In various embodiments, when the electronic device 100 receives precise map data, the electronic device 100 may receive precise navigation map data related to at least one map layer selected based on the profile information of the vehicle 10 from among a plurality of map layers that are combined to form a navigation map and distinguished according to attributes thereof.

In various embodiments, the vehicle 10 may travel from a first area to a second area. In this case, the electronic device 100 may transmit, to the server 30, profile information corresponding to the second area, which is different from the profile information of the vehicle 10. The electronic device 100 may receive, as a result of the transmission, precise map data related to at least one map layer selected from among a plurality of map layers based on the profile information corresponding to the second area.

When the precise map data is received in operation 902, the electronic device 100 may control the vehicle 10 to perform autonomous driving by using the received at least one precise map data (operation 903). Accordingly, the vehicle 10 may autonomously perform a lane change or speed adjustment in a situation where there is no or minimized driver intervention.

Figure 10:
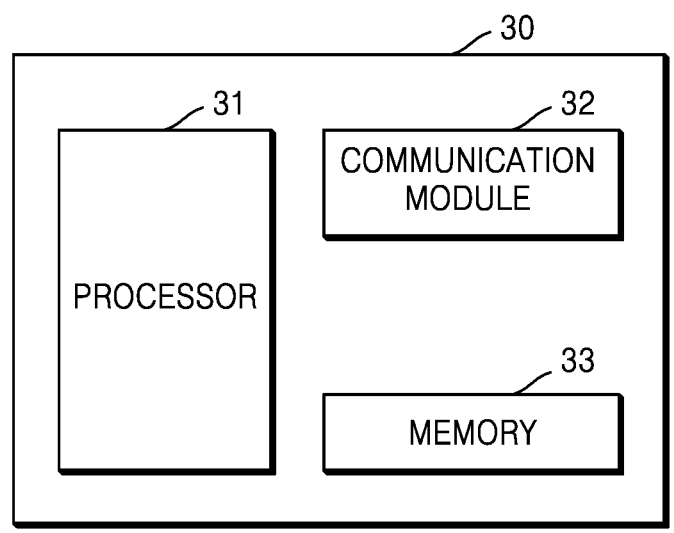
FIG. 10 is a block diagram of a configuration of a server according to an embodiment.

FIG. 10 is a block diagram of a configuration of a server 30 according to an embodiment.

The server 30 may include a processor 31, a communication module 32, and a memory 33. All components shown in FIG. 10 are not essential components of the server 30. The server 30 may be implemented with more or fewer components than those shown in FIG. 10.

The server 30 may be a cloud server or vehicle-to-everything (V2X) server, but is not limited thereto. According to various embodiments, at least one of a smartphone, a tablet PC, a phone, a video phone, an e-book reader, a laptop PC, a netbook computer, a wearable device, a PMP, or an MP3 player may act as the server 30 instead.

The processor 31 may execute software to control at least one other component (e.g., a hardware or software component) of the server 30 connected to the processor 31 and perform various types of data processing or computations. According to an embodiment, as at least a part of data processing or computation, the processor 31 may load commands or data received from another component into a volatile memory, process the commands or data stored in the volatile memory, and store the resulting data in a non-volatile memory.

The communication module 32 may support establishing a direct (e.g., wired) communication channel or a wireless communication channel between the server 30 and an external electronic device (e.g., the vehicle 10 or another vehicle 20) and performing communication via the established communication channel. The communication module 32 may include one or more CPs that operate independently of the processor 31 and support a direct (e.g., wired) communication or wireless communication. According to an embodiment, the communication module 32 may include a wireless communication module (e.g., a cellular communication module, a short-range wireless communication module, or a GNSS communication module) or a wired communication module (e.g., a LAN communication module or PLC module). The communication module 32 may communicate with an external electronic device via a first network (e.g., a short-range communication network such as Bluetooth™ WFD, or IrDA) or a second network (e.g., a long-range communication network such as a cellular network, the Internet, or a computer network (e.g., a LAN or WAN)). Various types of communication modules may be integrated into a single component (e.g., a single chip) or be implemented as a plurality of separate components (e.g., a plurality of chips).

The memory 33 may store various types of data used by at least one component (e.g., the processor 31) of the server 30. The various types of data may include, for example, software and input data or output data for a command related thereto. The memory 33 may include a volatile memory or a non-volatile memory.

In various embodiments, the server 33 may include the communication module 32 communicating with the vehicle 10, at least one processor 31 executing at least one instruction, and the memory 33 storing the at least one instruction and a plurality of map layers distinguished according to attributes thereof. The at least one processor 31 may execute the at least one instruction to control the communication module 32 to receive, from the vehicle 10, as profile information of the vehicle 10, sensor information regarding at least one sensor mounted on the vehicle 10, communication efficiency information of the vehicle 10, and location information of the vehicle 10 The server 30 may select, based on the received profile information of the vehicle 10, at least one map layer from among a plurality of map layers combined to form a precise map based on the received profile information of the vehicle 10. The server 30 may control the communication module 32 to transmit precise map data related to the selected at least one map layer to the vehicle 10.

In various embodiments, the at least one processor 31 may update another map layer by using feature data included in one map layer among a generated plurality of map layers. The at least one processor 31 may select the updated map layer from among the plurality of map layers and control the communication module 32 to transmit precise map data related to the updated map layer to the vehicle 10.

In various embodiments, the at least one processor 31 may cross-check pieces of feature data included in two or more map layers among a generated plurality of map layers against each other. The at least one processor 31 may select a verified map layer from among a plurality of map layers and control the communication module 32 to transmit precise map data related to the verified map layer to the vehicle 10.

Figure 11:
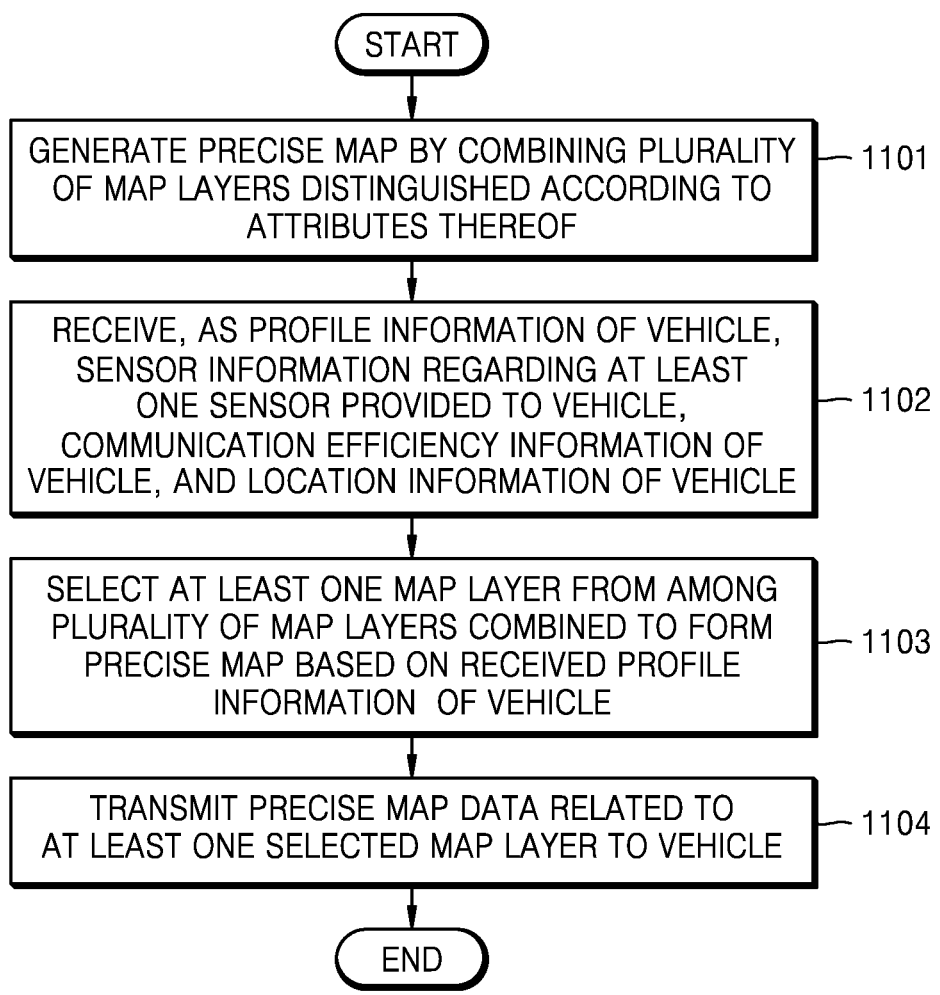
FIG. 11 is a flowchart of a method, performed by a server, of providing precise map data, according to an embodiment.

FIG. 11 is a flowchart of a method, performed by the server 30, of providing precise map data, according to an embodiment.

Referring to FIG. 11, the server 30 may generate a precise map in which a plurality of map layers distinguished according to attributes thereof are combined by using precise map data or driving data collected from the plurality of other vehicles 20 (operation 1101). For example, the server 30 may collect pieces of precise map data from each of the plurality of other vehicles 20. The server 30 may respectively extract pieces of feature data related to attributes of a plurality of map layers from the collected pieces of precise map data. The server 30 may generate a precise map by combining the generated plurality of map layers using the extracted pieces of feature data.

The server 30 may receive, from the vehicle 10, as profile information of the vehicle 10, sensor information regarding at least one sensor mounted on the vehicle 10, communication efficiency information of the vehicle 10, and location information of the vehicle 10 (operation 1102).

The server 30 may select, based on the received profile information of the vehicle 10, at least one map layer from among the plurality of map layers combined to form the precise map (operation 1103).

In various embodiments, the server 30 may update another map layer by using feature data included in one map layer among the plurality of map layers.

In various embodiments, the server 30 may cross-check pieces of feature data included in two or more map layers among the plurality of map layers against each other.

When the at least one map layer is selected in operation 1103, the server 30 may transmit precise map data related to the at least one selected map layer to the vehicle 10 (operation 1104).

In various embodiments, the server 30 may select the updated map layer and transmit precise map data related to the updated map layer to the vehicle 10.

In various embodiments, the server 30 may select a map layer that has undergone cross-checking between two or more map layers and transmit precise map data related to a map layer verified as a result of the cross-checking to the vehicle 10.

Figure 12:
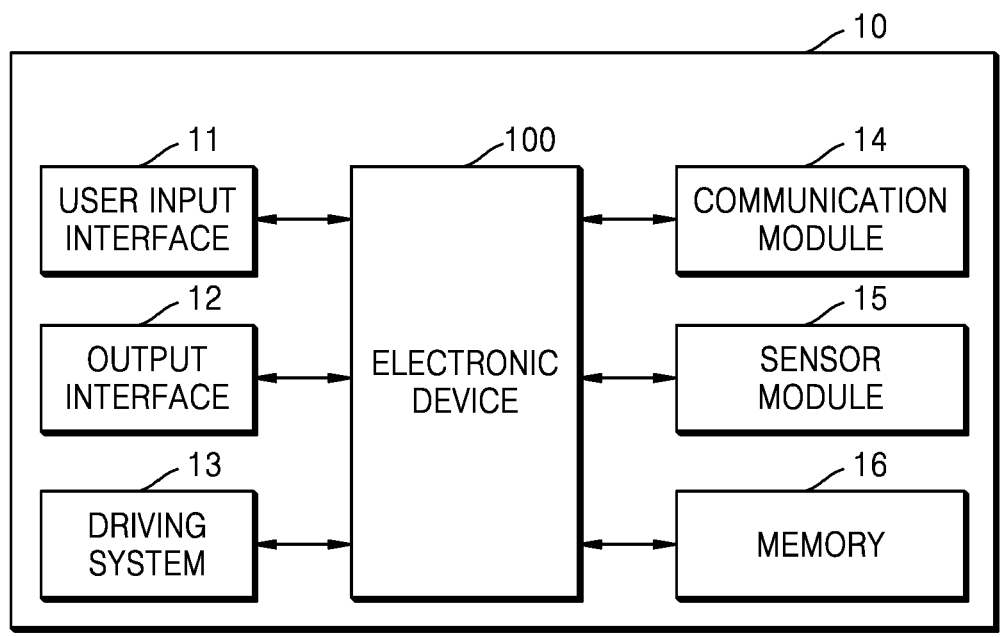
FIG. 12 is a block diagram of a configuration of a vehicle according to an embodiment.

FIG. 12 is a block diagram of a configuration of a vehicle 10 according to an embodiment.

Referring to FIG. 12, the vehicle 10 may include a user input interface 11, an output interface 12, a driving system 13, a communication module 14, a sensor module 15, a memory 16, and an electronic device 100. It will be understood by those of ordinary skill in the art related to the present embodiment that the vehicle 10 may further include general-purpose components other than the components shown in FIG. 12.

The electronic device 100 may include at least one processor. The processor may include an artificial intelligence (AI) processor, and for example, the processor may assist the vehicle 10 in autonomous driving by using a learning network model of an AI system. In this case, the processor may be manufactured in the form of a dedicated hardware chip for AI or as part of an existing general-purpose processor (e.g., a CPU or AP) or dedicated graphics processor (e.g., a GPU). The electronic device 100 may generally control all operations of the vehicle 10. The electronic device 100 may control the output interface 12, the driving system 13, the communication module 14, and the sensor module 15 of the vehicle 10 by executing programs stored in the memory 16.

The user input interface 11 is a means via which a user (a driver, a passenger, etc.) inputs data necessary for controlling the vehicle 10. Examples of the user input interface 11 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, etc. Furthermore, the user input interface 11 may include a microphone, and the microphone may be configured to receive audio (e.g., a voice command) from the user of the vehicle 10.

The output interface 12 may output an audio signal or a video signal and include, for example, a display, a sound outputter, and a vibrator.

Examples of the display may include, but are not limited to, a head-up display (HUD), a windshield display, a combiner display, a dashboard display, a ceiling area, a rear surface of a seat, a side display, a front display, a rear display, a 360-degree display, or a door window glass.

The display may include at least one of a liquid crystal display (LCD), a thin film transistor (TFT)-LCD, an organic light-emitting diode (OLED), a flexible display, a 3D display, or an electrophoretic display. According to an embodiment, the display may include a transparent display. The transparent display may be implemented as a projection type display as well as a transparent LCD display, a transparent thin-film electroluminescent panel (TFEL) display, and a transparent OLED display. The projection-type display refers to a display employing a method of projecting and displaying an image on a transparent screen such as a HUD. The output interface 12 may include two or more displays according to its implemented configuration. Furthermore, when the display is configured as a touch screen by forming a layer structure with a touch pad, the display may be used as an input device (e.g., the user input interface 11) as well as an output device. The sound outputter outputs audio data received from the communication module 14 or stored in the memory 16. The sound outputter may include a speaker, a buzzer, etc. The vibrator may generate physical vibrations by using an electric energy.

The driving system 13 may include components used to drive (or allow the vehicle 10 to travel or operate) the vehicle 10. The driving system 13 may include at least one of a power supply, a driving device, or a peripheral device, but is not limited thereto. The driving device may include a brake unit, a steering unit, and a throttle. The brake unit may be a combination of mechanisms configured to decelerate the vehicle 10. For example, the brake unit may use friction to reduce the speed of a wheel/tire. The steering unit may be a combination of mechanisms configured to control a direction of the vehicle 10. The throttle may be a combination of mechanisms configured to control a velocity of the vehicle by controlling an operating speed of an engine/motor. By adjusting a throttle opening rate, the throttle may adjust the amount of a mixture gas of fuel and air supplied to the engine/motor or control power and thrust.

The peripheral device may include a navigation system, lights, direction indicators, windshield wipers, interior lights, a heater, and an air conditioner. The navigation system may be a system configured to determine a driving route for the vehicle 10. The navigation system may be configured to dynamically update a driving route while the vehicle 10 is traveling. For example, the navigation system may use data collected by a GPS module to determine the driving route for the vehicle 10. In various embodiments, the electronic device 100 may plan a driving route of the vehicle 10 based on information sensed by the sensor module 15. In addition, the electronic device 100 may control the driving system 13 according to the planned driving route. Accordingly, the vehicle 10 may autonomously perform a lane change or speed adjustment without driver intervention.

The communication module 14 may include at least one antenna for wirelessly communicating with another device (e.g., a terminal, external vehicle, or external server 30). The communication module 14 may correspond to the communication module 120 of the electronic device 100 described above or include the communication module 120. The communication module 14 may include one or more components that enable the vehicle 10 to communicate with the external vehicle or external server 30. For example, the communication module 14 may include at least one of a short-range wireless communication module, a mobile communication module, or a broadcast receiver, but is not limited thereto. The short-range wireless communication module may include, but is not limited to, a Bluetooth communication module, a NFC module, a wireless local area network (WLAN) (or Wi-Fi) communication module, a Zigbee communication module, an IrDA communication module, a WFD communication module, a UWB communication module, an Ant+ communication module, and a microwave (uWave) communication module. The mobile communication module transmits or receives a wireless signal to or from at least one of a base station, an external terminal, or a server on a mobile communication network. In this case, the wireless signal may include a voice call signal, a video call signal, or data in any one of various formats according to transmission and reception of a text/multimedia message. The broadcast receiver may receive broadcast signals and/or broadcast-related information from the outside via a broadcast channel. The broadcast channel may include a satellite channel and a terrestrial channel. In various embodiments, the communication module 14 may perform vehicle-to-vehicle (V2V) communication with an external vehicle located within a predetermined distance from the vehicle 10 and vehicle to infrastructure (V2I) communication with an infrastructure located within a predetermined distance from the vehicle 10.

The sensor module 15 may include multiple sensors configured to sense information about an environment surrounding the vehicle 10 and may include one or more actuators configured to modify positions and/or orientations of the multiple sensors. For example, the sensor module 15 may include a GPS, an IMU, a RADAR sensor, a LIDAR sensor, and an image sensor. According to an embodiment, the image sensor may include a camera, a stereo camera, a mono camera, a wide angle camera, or a 3D vision sensor. In addition, the sensor module 15 may include at least one of a temperature/humidity sensor, an infrared sensor, an ultrasonic sensor, a proximity sensor, or an illumination sensor, but is not limited thereto. For example, the sensor module 15 may include a barometric pressure sensor and a dust sensor. Furthermore, the sensor module 15 may be configured in a form in which the image sensor is combined with the RADAR sensor, or in a form in which the image sensor is combined with the LIDAR sensor. Functions of the sensors may be intuitively inferred from their names by those of ordinary skill in the art, and thus detailed descriptions thereof will be omitted here. The sensor module 15 may include a motion sensor capable of sensing motion of the vehicle 10. The motion sensor may include a geomagnetic sensor, an acceleration sensor, and a gyroscope sensor.

Among the multiple sensors, the GPS may be a sensor configured to estimate a geographic location of the vehicle 10. In other words, the GPS may include a transceiver configured to estimate a location of the vehicle 10 on the Earth. The IMU may include a combination of sensors configured to sense changes in the location and orientation of the vehicle 10 based on inertial acceleration. For example, the combination of sensors may include accelerometers and gyroscopes. The RADAR sensor may be a sensor configured to detect objects in an environment where the vehicle 10 is located by using radio signals. The RADAR sensor may be configured to detect velocities and/or directions of the objects. The LIDAR sensor may be a sensor configured to measure a distance to an object by analyzing light reflected from an object by mainly using near-infrared (NIR) light. Data measured by the LIDAR sensor may be used to represent a 3D image. Furthermore, in an embodiment, the LIDAR sensor may be a sensor configured to detect objects in an environment where the vehicle is located by using laser beams. In detail, the LIDAR sensor may include a laser light source and/or a laser scanner configured to emit a laser beam and a detector configured to detect a reflected laser beam. The LIDAR sensor may be configured to operate in a coherent (e.g., using heterodyne detection) or incoherent detection mode. The image sensor may be a still camera or a video camera configured to record an external environment of the vehicle 10. For example, the image sensor may include a plurality of cameras provided at multiple positions inside or outside the vehicle 10. For example, three cameras and one camera may be respectively mounted in the front and rear of the vehicle 10, and two cameras may be mounted on each of the left and right sides of the vehicle 10, but embodiments are not limited thereto. The ultrasonic sensor may be a sensor configured to detect obstacles located at a short distance from the vehicle 10 by using echo signals returned by outputting ultrasonic waves.

According to an embodiment, the sensor module 15 may collect driving data for a specific route while the vehicle 10 travels on the specific route. For example, the sensor module 15 may obtain driving data including at least one of images of roads, infrastructure, and a surrounding environment on a route along which the vehicle 10 is traveling, detected data, or measurement data by using at least one of the above-described various types of sensors.

The memory 16 may store programs necessary for processing or control related to the vehicle 10 and input/output data (e.g., a sensing value, road condition information, a precise map, information about surroundings, a driving route, a surrounding environment image, etc.) The communication module 14 may correspond to the memory 130 of the electronic device 100 described above, or may include the memory 130. The memory 16 may include at least one type of storage medium from among a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc. Furthermore, the vehicle 10 may operate a web storage or a cloud server that performs a storage function on the Internet.

According to various embodiments, the vehicle 10 may execute at least one instruction stored in the memory 16 to control the communication module 14 to transmit, to the external server 30 communicatively connected to the vehicle 10, sensor information regarding at least one sensor mounted on the vehicle 10, communication efficiency information of the vehicle 10, and driving information of the vehicle 10 as profile information of the vehicle 10. Next, the vehicle 10 may control the communication module 14 to receive, from the external server 30, precise map data related to at least one map layer selected based on the profile information of the vehicle 10 from among a plurality of map layers that are combined to form a precise map and distinguished according to attributes thereof. When the precise map data is received, the vehicle 10 may control the driving system 13 so that the vehicle 10 performs autonomous driving by using at least one received precise map data.

As used herein, the term "module" or "part" may include a unit implemented in hardware, software, or firmware, and may be used interchangeably with another term such as logic, logic block, component, or circuitry. The module may be an integrally formed component, or a minimum unit or part thereof configured to perform one or more functions.

For example, according to an embodiment, the module may be implemented in a form of an application-specific integrated circuit (ASIC).

Various embodiments as set forth herein may be implemented as software (or programs) including one or more instructions stored in a storage medium (e.g., the memory 130 or external memory) that is readable by a machine (e.g., the electronic device 100). For example, the machine (e.g., the electronic device 100) may invoke at least one of the one or more instructions stored in the storage medium and execute the invoked at least one instruction. This allows the machine to be operated to perform at least one function according to the invoked at least one instruction. The one or more instructions may include a code generated by a complier or a code executable by an interpreter. The machine-readable storage medium may be provided in the form of a non-transitory storage medium. In this regard, the term 'non-transitory' only means that the storage medium is a tangible device and does not include a signal (e.g., an electromagnetic wave), and the term does not differentiate between where data is semi-permanently stored in the storage medium and where the data is temporarily stored in the storage medium.

According to an embodiment, methods according to various embodiments of the present disclosure may be included in a computer program product when provided. The computer program product may be traded, as a product, between a seller and a buyer. The computer program product may be distributed in the form of a machine-readable storage medium (e.g., compact disc-read only memory (CD-ROM)) or distributed (e.g., downloaded or uploaded) on-line via an application store (e.g., Google™, Play Store™) or directly between two user devices (e.g., smartphones). For online distribution, at least a part of the computer program product may be at least transiently stored or temporally generated in the machine-readable storage medium such as memory of a server of a manufacturer, a server of an application store, or a relay server.

According to various embodiments, each (e.g., a module or a program) of the above-described components may include a single entity or a plurality of entities. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by a module, a program, or another component may be carried out sequentially, in parallel, repeatedly, or heuristically, or one or more of the operations may be executed in a different order or omitted, or one or more other operations may be added.

The invention claimed is:

1. A method, performed by an electronic device, of controlling a vehicle, the method comprising:
when an area in which the vehicle drives changes according to a movement of the vehicle, transmitting, to an external server communicatively connected to the vehicle, profile information of the vehicle corresponding to the changed area, wherein the profile information includes sensor information regarding at least one sensor mounted on the vehicle, available bandwidth information of the vehicle, and a range of coverage of autonomous driving information of the vehicle;
receiving, from the external server, precise map data related to at least one map layer selected based on the profile information of the vehicle from among a plurality of map layers, wherein the plurality of map layers are verified by cross-checking pieces of feature data included in at least two map layers among the plurality of map layers against each other, by the external server; and
controlling the vehicle to perform autonomous driving by using the received precise map data.

2. The method of claim 1,
wherein the profile information of the vehicle further includes information about a surrounding environment of the vehicle, and
wherein the received precise map data comprises precise map data related to at least one map layer selected based on the information about the surrounding environment of the vehicle from among the plurality of map layers.

3. The method of claim 1, wherein the receiving of the precise map data comprises receiving, from the external server, precise navigation map data related to at least one map layer selected based on the profile information of the vehicle from among a plurality of map layers that are combined to form a navigation map and distinguished according to attributes thereof.

4. The method of claim 1,
wherein the transmitting of the profile information comprises:
when the vehicle travels from a first area to a second area, transmitting, to the external server, profile information corresponding to the second area, which is different from the profile information of the vehicle, and
wherein the receiving of the precise map data comprises receiving precise map data related to at least one map layer selected from among the plurality of map layers based on the profile information corresponding to the second area.

5. The method of claim 1, wherein the available bandwidth information of the vehicle includes at least one of a transmission speed of communication with the external server or a communication bandwidth allocated for the communication with the external server.

6. The method of claim 1, wherein the sensor information includes at least one of a sensor type, a number of sensors, a sensor mounting location, or a sensor specification.

7. The method of claim 1, wherein the profile information of the vehicle further includes driving information of the vehicle, the driving information of the vehicle includes at least one of information about a location where the vehicle is traveling, information about an area through which the vehicle is traveling, information about a driving route of the vehicle, or information about a driving plan for the vehicle.

8. The method of claim 1, wherein the profile information further includes a level of autonomy required for driving of the vehicle selected from one of six levels starting at a first level corresponding to no automation in which a driver is in complete control of the vehicle and ending at a sixth level corresponding to full automation in which the driver does not intervene in driving in any situation.

9. A method, performed by a server, of providing precise map data, the method comprising:

storing a precise map generated by combining a plurality of map layers distinguished according to attributes thereof;
when an area in which a vehicle drives changes according to a movement of the vehicle, receiving, from the vehicle communicating with the server, profile information of the vehicle corresponding to the changed area, wherein the profile information includes sensor information regarding at least one sensor mounted on the vehicle, available bandwidth information of the vehicle, and a range of coverage of autonomous driving information of the vehicle;
selecting at least one map layer from among the plurality of map layers based on the received profile information of the vehicle, wherein the plurality of map layers are verified by cross-checking pieces of feature data included in at least two map layers among the plurality of map layers against each other, by the server; and
transmitting precise map data related to the selected at least one map layer to the vehicle.

10. The method of claim 9, further comprising:
collecting pieces of precise map data respectively from each of a plurality of vehicles;
respectively extracting pieces of the feature data related to the attributes of the plurality of map layers from the collected pieces of precise map data; and
generating the precise map by combining the at least two map layers verified by cross-checking pieces of the feature data included in the at least two map layers using the extracted pieces of feature data.

11. The method of claim 9, further comprising:
updating another map layer by using feature data included in one map layer among the plurality of map layers,
wherein the transmitting of the precise map data to the vehicle comprises transmitting precise map data related to the updated map layer to the vehicle.

12. The method of claim 9, wherein the transmitting of the precise map data related to the selected at least one map layer to the vehicle comprises:
extracting feature data from the selected at least one map layer;
generating precise map data related to the at least one map layer by using the extracted feature data; and
transmitting the generated precise map data to the vehicle.

13. An electronic device for controlling a vehicle, the electronic device comprising:
communication circuitry configured to communicate with an external server;
at least one processor; and
at least one memory storing at least one instruction which, when executed by the at least one processor, causes the at least one processor to:
control the communication circuitry to, when an area in which the vehicle drives changes according to a movement of the vehicle, transmit, to the external server communicatively connected to the vehicle, profile information of the vehicle corresponding to the changed area, wherein the profile information includes sensor information regarding at least one sensor mounted on the vehicle, available bandwidth information of the vehicle, and a range of coverage of autonomous driving information of the vehicle,
control the communication circuitry to receive, from the external server, precise map data related to at least one map layer selected from among a plurality of map layers based on the profile information of the vehicle,
wherein the plurality of map layers include at least two map layers cross-checking pieces of feature data against each other, and
control the vehicle to perform autonomous driving by using the received precise map data.

14. The electronic device of claim 13,
wherein the profile information of the vehicle further includes information about a surrounding environment of the vehicle, and
wherein the received precise map data comprises precise map data related to at least one map layer selected based on the information about the surrounding environment of the vehicle from among the plurality of map layers.

15. The electronic device of claim 13, wherein the at least one instruction, when executed by the at least one processor, further causes the at least one processor to:
when the vehicle travels from a first area to a second area, control the communication circuitry to transmit, to the external server, profile information corresponding to the second area, which is different from the profile information of the vehicle, and
control the communication circuitry to receive precise map data related to at least one map layer selected from among the plurality of map layers based on the profile information corresponding to the second area.

16. A server for providing precise map data, the server comprising:
communication circuitry configured to communicate with a vehicle;
at least one processor; and
at least one memory storing at least one instruction and a precise map generated by combining a plurality of map layers distinguished according to attributes thereof,
wherein the at least one instruction, when executed by the at least one processor, causes the at least one processor to:
control the communication circuitry to, when an area in which the vehicle drives changes according to a movement of the vehicle, receive, from the vehicle, profile information of the vehicle corresponding to the changed area, wherein the profile information includes sensor information regarding at least one sensor mounted on the vehicle, available bandwidth information of the vehicle, and a range of coverage of autonomous driving information of the vehicle,
select at least one map layer based on the received profile information of the vehicle, from among the plurality of map layers combined to form a precise map, wherein the plurality of map layers are verified by cross-checking pieces of feature data included in at least two map layers among the plurality of map layers against each other, by the server, and
control the communication circuitry to transmit precise map data related to the selected at least one map layer to the vehicle.

17. The server of claim 16, wherein the at least one instruction, when executed by the at least one processor, further causes the at least one processor to:
update another map layer by using feature data included in one map layer among the plurality of map layers, and
control the communication circuitry to transmit precise map data related to the updated map layer to the vehicle.

* * * * *